United States Patent [19]
Greer

[11] Patent Number: 4,904,171
[45] Date of Patent: Feb. 27, 1990

[54] LUBRICATING APPARATUS FOR CLAY EXTRUDERS

[76] Inventor: Jack B. Greer, P.O. Box 247, Siler City, N.C. 27344

[21] Appl. No.: 288,621

[22] Filed: Dec. 13, 1988

[51] Int. Cl.$^4$ .............................................. B29C 47/94
[52] U.S. Cl. ...................................... 425/97; 264/133; 425/102; 425/107; 425/376.1; 425/DIG. 115
[58] Field of Search ............... 425/97, 107, DIG. 115, 425/376.1, 385, 380, 102; 264/130, 133, 211, 213

[56] References Cited

U.S. PATENT DOCUMENTS

| | | | |
|---|---|---|---|
| 315,909 | 4/1885 | Chandler et al. | 425/97 |
| 721,152 | 2/1903 | Chambers, Jr. | 425/97 |
| 1,220,902 | 3/1917 | Steele | 425/97 |
| 1,816,572 | 7/1931 | Largura | 425/97 |
| 2,597,553 | 5/1952 | Weber | 425/97 |
| 2,649,618 | 8/1953 | Rhodes et al. | 425/DIG. 115 |
| 2,688,768 | 9/1954 | Rayburn | 425/97 |
| 3,907,069 | 9/1975 | Pryor et al. | 425/107 |
| 4,091,064 | 5/1978 | Kakinuma et al. | 425/97 |

FOREIGN PATENT DOCUMENTS

| | | | |
|---|---|---|---|
| 722799 | 3/1980 | U.S.S.R. | 425/107 |

*Primary Examiner*—Jay H. Woo
*Assistant Examiner*—K. P. Nguyen
*Attorney, Agent, or Firm*—Rhodes, Coats & Bennett

[57] ABSTRACT

A lubricating device for clay or ceramic extruders in the form of a separable lubricating ring inserted between the exit end of the extruder casing or barrel and the entrance end of the die. The lubricating ring includes an annular outer member having a substantially cylindrical inner wall. A frustoconical liner is affixed to the inner wall in such a manner as to form a reservoir therebetween and deliver a variably controlled supply of lubricant to the clay column at the entrance to the forming die. The frustoconical shape of the liner provides a negative angle of impingement between the clay and the lubricating ring resulting in longer life of the liner and an improved penetration of lubricant into the clay or ceramic material.

4 Claims, 2 Drawing Sheets

LUBRICATING APPARATUS FOR CLAY EXTRUDERS

BACKGROUND AND SUMMARY OF THE INVENTION

This invention is directed to clay extruders, and more particularly, to a unique and improved lubricating apparatus for clay extruders which improves the life expectancy of the die and lubricating apparatus, as well as improving the penetration of lubricant into the clay material. While the present invention will be described in connection with a brick extruder, it should be recognized that the inventive concept is equally applicable to any type of extruder in which clay, ceramics, or other material is processed and which requires lubrication of the material at or approximately near the entrance to the forming die.

In the extrusion of clay for bricks, the raw clay passes through an extruder casing which is generally round or oval in cross-section. At the exit end of the extruder, the clay is introduced into a forming die which transforms the cross-sectional shape of the clay column into a rectangular bar from which the individual bricks are eventually cut. In the forming die, the plastic moving body or stream of clay or other ceramic material must be gradually diminished in size and shape into a rectangular form that issues forth from the exit end of the die. As a result, a tremendous amount of energy is expended, and considerable friction occurs between the clay and the side walls of the forming die, particularly in the areas which eventually become the corners of the brick. This friction may cause some areas of the clay to move faster or slower than other portions. The use of conventional bridges (for forming holes in the brick) tend to exaggerate this problem. In order to alleviate this problem and ensure that the side and corner portions of the clay move with sufficient ease, speed, and uniform velocity, there have been previously utilized devices, called "oil rings", for applying oil or other suitable lubricants to the surface, and particularly to the corners of the stream of clay. As a result the side and corner portions of the brick are caused to advance with reduced friction and wear, thereby producing better bricks, in that they are smoother and more compact at the edges and corners. See U.S. Pat. Nos. 721,152 to Chambers, Jr. and 1,220,902 to Steele for examples of earlier lubricating devices.

Generally, such lubricating systems are formed in and as part of the forming die. See U.S. Pat. No. 4,174,933 to Mitchell et al. In a relatively recent type of conventional clay extruder, raw clay is moved along a cylindrical barrel by a screw or ram and forced through the forming die which has a circular or oval entrance and a rectangular outlet. The term "cylindrical" includes cross-sections which are either circular or oval shaped. The forming die includes a conduit or passageway therein for the introduction of lubricant. A liner is welded to the inner surface of the die adjacent the entrance thereof and includes one edge (downstream) which has openings therein through which lubricant is allowed to pass into the clay material. As the clay leaves the extruder casing, which generally has a circular or oval opening at the end thereof, it immediately contacts the liner which is tapered inwardly in the same general shape as the die. This results in the clay impinging upon the surface of the liner at a positive angle resulting in rapid wear or deterioration of the liner. When the liner is worn, the entire die must be replaced or refurbished. Unless the brick plant carries an identical spare die, there then results "downtime" which is very expensive. Spare dies are also very expensive.

The lubricant is applied in such conventional apparatuses at a point several inches downstream from the entrance to the die, after the clay has begun to be compacted. As a result it is difficult to obtain good penetration of the lubricant into the compacted surface of the clay.

In order to address these concerns, the present invention first separates the lubricating function from the die by providing a separable lubricating ring interposed between the exit end of the extruder casing and the entrance end of the forming die. In this separable lubricating ring, the functions of receiving lubricant, conducting and storing the lubricant under pressure throughout the lubricating ring, and causing the lubricant to pass therefrom and into the clay are all self-contained within the lubricating ring.

Secondly, the lubricating ring is formed of an annular outer member having a cylindrical inner surface and a frustoconical liner attached at one edge to the inner surface thereof and spring-biased at the downstream edge against the inner surface of the outer member providing a reservoir for the lubricant therebetween. Because of the frustoconical shape, the liner actually presents negative angle of impingement which achieves several surprising results. First of all, the liner is not subject to the rapid wear and deterioration as would occur in a liner having a positive angle of impingement. Because of the frustoconical shape and negative angle of impingement, the clay column actually expands as it passes through the lubricating ring so that the clay loosens and allows better penetration of lubricant thereinto. Finally, when the liner does become worn and must be replaced, only the lubricating ring must be removed and refurbished. Since the lubricating ring does not have a peculiarly machined or formed inner surface and is compatible with substantially all dies, it is much more economical to carry spare lubricating rings than spare dies.

Another feature of the lubricating ring is the provision of spaced dams between the liner and the inner surface of the outer annular member and a plurality of inlet ports for lubricant. So arranged, the lubricating ring can be divided into quadrants, so that a controlled supply of lubricant can be directed to selected areas of the clay column. Some quadrants may receive differing quantities of lubricant from other quadrants. The dams actually divide the reservoir of the lubricating ring into a plurality of separate chambers.

The liner is fabricated as a relatively thin, frustoconical plate having a first and second edge. The first edge, when assembled on said lubricating ring, is positioned at the upstream end thereof adjacent the exit end of the extruder casing. The second edge, when assembled, is positioned adjacent the entrance of the forming die at the downstream end of the lubricating ring. The first edge is formed with a diameter less than the diameter of the inner wall of the annular outer member and the second edge is formed with a diameter slightly greater than the corresponding inner diameter of the inner wall of the annular outer member. So arranged, when the liner is assembled, the first edge is spaced from the inner wall by a rod which extends around the inner wall and secured thereto by welding. The second or downstream edge is then caused to be spring-biased against the inner wall because of the frustoconical shape and diameter thereof. The lubricant, because of the pressure within the reservoir and a plurality of axially extending grooves which extend along the inner wall of the outer member, is caused to exude beneath the second edge into the surface of the clay material passing thereby.

It is therefore an object of the present invention to provide an improved lubricating device for clay or ceramic extruders.

It is another object of the present invention to provide a lubricating device of the type described which includes a separable lubricating ring inserted between the exit end of the extruder casing and the entrance end of the die.

It is yet another object of the present invention to provide a lubricating device of the type described which includes a frustoconical liner affixed to an annular outer member in such a manner as to provide a negative angle of impingement between the clay and the lubricating ring.

It is yet another object of the present invention to provide a replaceable liner for lubricating rings of the type described.

Other objects and a fuller understanding of the invention will become apparent from reading the following detailed description of a preferred embodiment along with the accompanying drawings in which.

DETAILED DESCRIPTION OF A PREFERRED EMBODIMENT

Figure 1:
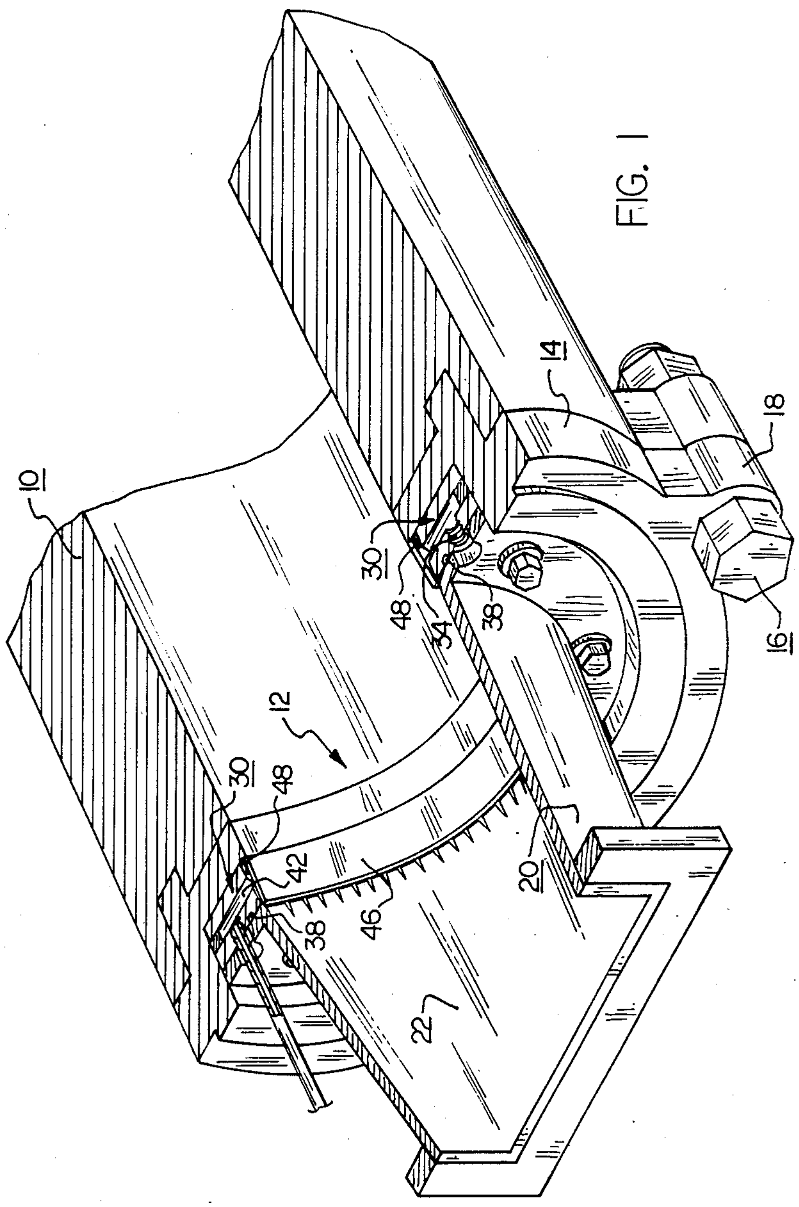
FIG. 1 is a sectional perspective view illustrating the exit end of an extruder casing, the entrance end of a forming die, and the lubricating ring of the present invention inserted therebetween.

Turning now to FIG. 1, numeral 10 indicates the front portion of the extruder casing. A hopper or bin (not shown) contains a mixture of clay and water which is introduced into the extruder casing upstream of the exit end thereof. The clay is then forced downstream through the exit end 12 of the extruder barrel by some type of ram or auger (not shown). Preferably a front mounting ring or adapter 14 is secured to the front end of the extruder barrel 10 by means of mounting bolts 16 through lugs 18. The purpose of the mounting plate 14 is two-fold, i.e., to provide a mounting area for the die (or in the present invention, the lubricating ring) and to preferably adapt oval-shaped extruder casings to a clay column that is round in cross-section before entering the die. It should be pointed out here that in some extruders, the adapter or mounting plate 14 can be eliminated, in which case the die or lubricating ring will be mounted directly to the front end of the casing 10.

While in conventional extruders, a die 20 will be mounted directly to the mounting plate 14, in accordance with the present invention, the lubricating device 30 is mounted to the mounting plate 14, and the die 20 is then affixed to the outer surface of the lubricating device 30.

Figure 3:
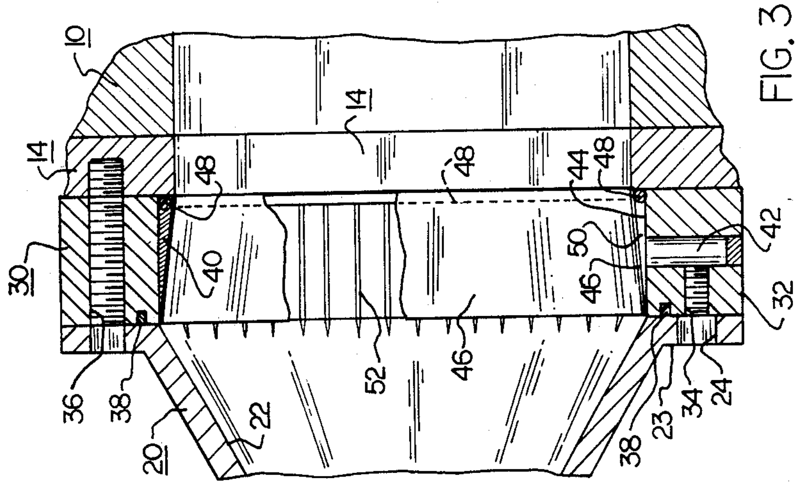
FIG. 3 is a sectional view taken substantially along lines 3—3 in FIG. 2 and illustrating a portion of the die attached to the front side and a portion of the extruder casing attached to the rear side of the lubricating ring.
Figure 2:
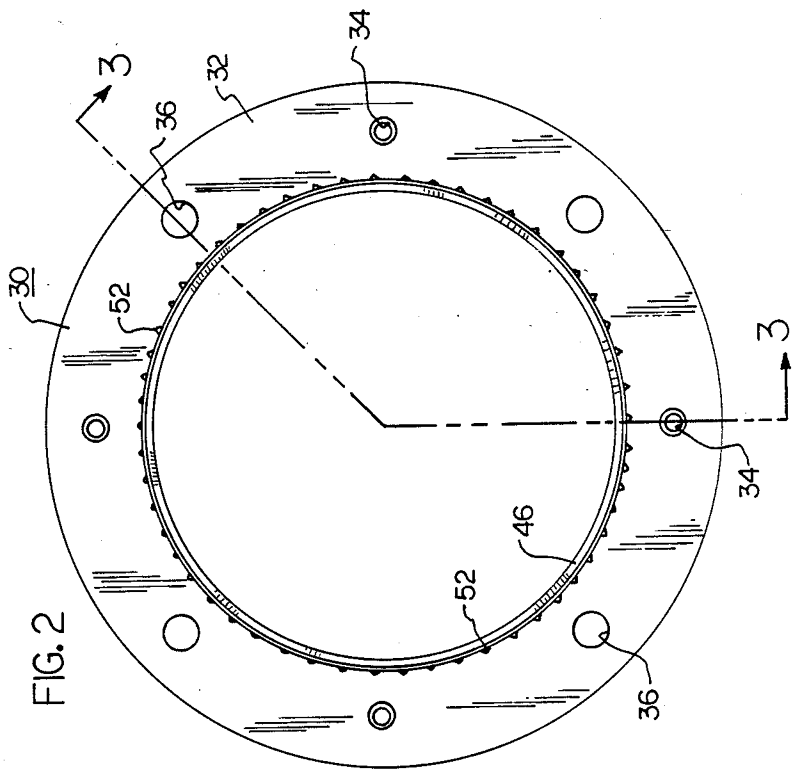
FIG. 2 is a front view of the lubricating ring according to the present invention.

Turning now to FIGS. 2 and 3, the lubricating device 30 is better shown and includes an annular outer member 32 of a material that is preferably the same as or compatible with the barrel casing 10 and die 20. Looking at the front of the annular member 32, there are provided a plurality of mounting holes 36 spaced about the periphery thereof through which mounting bolts (not shown) extend to secure the lubricating device to the front end of the extruder barrel. In the preferred embodiment, there are four lubricating ports 34 spaced equally around the annular member 32, each of which is threaded on the inner surface thereof to receive a connector coupling of a hose extending from a source of lubricant through which the lubricant is delivered to the lubricating device 30. One or more holes or openings 36 in the face of annular member 32 are provided to properly align and orient the annular member 32 with respect to the mounting plate 14. An annular groove is provided with a seal 38 on one or both surfaces, of the annular member 32 to seal the annular member to the adjacent flange of either the die or mounting plate.

Looking at FIG. 3, a radial opening 42 extends inwardly and in communication with each lubricant port 34 to provide communication for the lubricant to the inner wall 44 of annular member 32. A relatively thin frustoconical shaped liner or wear plate 46 having an upstream edge and a downstream edge extends around the inner surface of said cylindrical inner wall 44. The upstream edge of liner 46 is secured in spaced arrangement to the inner wall by means of a rod 48. Both the upstream edge and rod 48 are welded together with the inner wall 44 to secure the liner 46 thereto. The downstream edge of liner 46 is of a diameter greater than the diameter of inner wall 44, and thus is biased against the surface. The diameter of rod 48 and axial length of inner wall 44 determine the negative taper of liner 46, which is preferably defined by the angle whose sin is in the range of 0.070–0.100.

The inner wall 44, rod 48, and liner 46 form a reservoir 50 extending around the annular member 32 which receives and stores lubricant under pressure from the inlet ports 42,34. A plurality of dams or walls 40 extend between liner 46 and wall 44 at spaced points equidistant between adjacent ports 34,42 to section off the reservoir 50 into four chambers. Each chamber carries sufficient lubricant to lubricate the clay which will eventually become one corner of the brick. The lubricant introduced through ports 34,42 may vary from quadrant to quadrant, so that some portions of the clay may receive more lubricant than others, if conditions warrant. The lubricant is provided to the reservoir 50 through ports 34,42 in such amounts as to retain a pressure therein in the range of 500–900 psi.

A plurality of longitudinally or axially extending grooves 52 are cut into the surface of inner wall 44 as illustrated in FIG. 3. Such grooves provide an exit for the lubricant beneath the edge of liner 46 into the adjacent clay passing thereby when the oil is maintained at the specified pressures. Should the pressure exceed the specified range, lubricant will tend to force the edge of liner 46 away from inner wall 44 and oil will exude therethrough, not only at the points of the grooves but all the way around the periphery thereof.

The die 20, itself, is formed of a conventional die material having a hardened inner surface 22 which tapers from a circular entrance to a rectangular exit. The entrance end conventionally includes a flange 23 therearound with access openings 24 at points spaced correspondingly to the oil ports 34. The oil tubes or hoses are secured, however, to the threaded openings 34. The openings 24 in the flanges of the die 20 are greater in diameter to provide access for the oil tube therethrough. If desired, the die may be provided with bridges which include rods extending longitudinally therefrom to form holes in the extruded brick column.

The provision of a separable lubricating ring 30 and the peculiar construction of the liner 46 with relation to the flow path of the clay column and the entrance of the die are important aspects of the present invention. The inner diameter of the upstream end of liner 46 is, as illustrated, less than the corresponding inner diameter of the annular member 32. On the other hand, the diameter of the downstream edge of liner 46 is greater than the corresponding inner diameter of annular member 32. So arranged, as described hereinabove, the liner 46 is caused to be resiliently biased against the inner wall 44 of annular member 32 at the downstream edge thereof. It should be noted as best shown in FIG. 3, that this construction also provides a negative angle of impingement of the clay column against liner 46. This negative angle of impingement achieves the unexpected results of extending the life of the liner 46 and causing the clay column to expand and loosen, whereby a better penetration of the lubricant into the clay column is obtained.

As a result of the entire combination, the lubricating ring may be used longer between refurbishment, only the lubricating ring is removed when refurbishment is required, and the greatest point of wear is moved to the entrance end of the die against the wall 22 which is specifically designed to absorb the greater pressures exhibited thereagainst.

The liner or wear plate 46 is itself formed of a hard, spray-coated, steel plate approximately ⅛-inch in thickness and spray hardened to a 63 Rockwell finish.

While a preferred embodiment of the present invention has been described in detail hereinabove, it is obvious that various changes and modifications might be made without departing from the scope of the invention which is set forth in the accompanying claims.

What is claimed:

1. A lubricating device for ceramic extruders of the type used in a brickmaking process in which raw clay is moved along a cylindrical barrel by a screw or ram and forced through a forming die having a rectangular outlet and a generally circular inlet, said lubricating device comprising:

(a) an outer annular member having a cylindrical inner wall and including means associated therewith for removably connecting said annular member between the downstream end of said cylindrical barrel and the upstream end of said forming die;

(b) at least one lubricating port extending through said annular member and forming a passageway for lubricant between the exterior of said annular member and said inner wall thereof;

(c) a relatively thin, frustoconical liner or wear plate having an upstream edge and a downstream edge extending around said cylindrical inner wall, the diameter of the upstream edge being less than the diameter of the downstream edge, the upstream edge of said liner being secured in spaced arrangement to said inner wall and the downstream edge of said liner being spring-biased against the surface of said inner wall, whereby a reservoir is formed between said annular member and said liner;

(d) a plurality of grooves extending longitudinal of the surface of said inner wall and providing a spaced series of outlets for said lubricant between said inner wall and said downstream edge of said liner;

(e) whereby, when connected to said extruder, said lubricating device provides for the continuous delivery of oil under pressure to the reservoir formed between said annular member and said frustoconical liner from which is passes through said grooves beneath the downstream edge of said liner and into said clay material adjacent the entrance to said forming die.

2. The lubricating device according to claim 1 wherein there are provided a plurality of said lubricating ports, and a dam or wall extends between said liner and said inner wall of the annular member substantially midway between each pair of lubricating ports thereby forming a plurality of lubricating chambers, there being one lubricating chamber for each lubricating port, whereby the amount of lubricant provided to one area of said clay column may vary from the amount of lubricant provided to another area.

3. The lubricating device according to claim 1 wherein the taper on said frustoconical liner is substantially the angle whose sin is in the range of 0.070–0.100.

4. The lubricating device according to claim 1 wherein the diameter of said inner wall of said annular member is greater than the inner diameter of said cylindrical extruder barrel and substantially the same as the inner diameter of the entrance end of said forming die, and the diameter of said upstream edge of said liner being substantially the same as the inner diameter of said cylindrical extruder barrel.

* * * * *